(12) United States Patent
Scheller et al.

(10) Patent No.: US 7,815,777 B2
(45) Date of Patent: Oct. 19, 2010

(54) POWER SUPPLY DEVICE IN A DEVICE FOR ELECTROCHEMICAL TREATMENT

(75) Inventors: Britta Scheller, Altdorf (DE); Klaus Brehm, Pyrbaum (DE); Olaf Lorenz, Altdorf (DE)

(73) Assignee: Atotech Deutschland GmbH, Berlin (DE)

( * ) Notice: Subject to any disclaimer, the term of this patent is extended or adjusted under 35 U.S.C. 154(b) by 393 days.

(21) Appl. No.: 10/570,280

(22) PCT Filed: Aug. 18, 2004

(86) PCT No.: PCT/EP2004/009272

§ 371 (c)(1), (2), (4) Date: Oct. 19, 2006

(87) PCT Pub. No.: WO2005/028718

PCT Pub. Date: Mar. 31, 2005

(65) Prior Publication Data

US 2007/0039816 A1  Feb. 22, 2007

(30) Foreign Application Priority Data

Sep. 4, 2003 (DE) .............................. 103 40 888

(51) Int. Cl.
*C25C 7/00* (2006.01)
*B23H 3/00* (2006.01)
*C25B 9/00* (2006.01)

(52) U.S. Cl. .................. 204/193; 204/242; 204/297.14; 204/640

(58) Field of Classification Search .................. 242/242, 242/224; 204/242, 224, 297.14; 206/338, 206/710; 205/338, 710

See application file for complete search history.

(56) References Cited

U.S. PATENT DOCUMENTS

| 3,616,447 A | 10/1971 | Hayford et al. |
| 4,752,371 A | 6/1988 | Kreisel et al. |
| 4,800,001 A | 1/1989 | Ott et al. |
| 4,898,657 A | 2/1990 | Hosten |
| 5,000,833 A | 3/1991 | Imhof et al. |

(Continued)

FOREIGN PATENT DOCUMENTS

AU   2003210140 A1   9/2003

(Continued)

OTHER PUBLICATIONS

Gault, N., European Patent Office, Internationaler Vorläufiger Bericht Über Die PatentierBarkeit (International Preliminary Report on Patentability) for PCT International Application No. PCT/EP2004/009272, Dec. 13, 2005.

*Primary Examiner*—Alexa Neckel
*Assistant Examiner*—Zulmariam Mendez
(74) *Attorney, Agent, or Firm*—McDonnell Boehnen Hulbert & Berghoff LLP

(57) ABSTRACT

In order for electrical feeds (2, 3) of an electrical supply unit for material (1) to be treated, in a device for the electrochemical treatment thereof, to be protected against metal deposition, it is proposed that at least one electrically insulating shell (7, 8) should be provided, which encloses the at least one electrical feed (2, 3), over a particular length starting from contact means (12) for making contact with the material to be treated, so that no metal deposit of more than 0.04 mm is formed on the blank parts of the electrical feed when the electrical feed (2, 3) is immersed up to this particular length in a liquid during the electrochemical treatment of the material (1) to be treated.

28 Claims, 4 Drawing Sheets

U.S. PATENT DOCUMENTS

| | | | |
|---|---|---|---|
| 5,223,116 A | 6/1993 | Hosten | |
| 5,266,180 A * | 11/1993 | Harnoncourt et al. | 204/415 |
| 5,405,518 A * | 4/1995 | Hsieh et al. | 204/297.05 |
| 5,932,081 A | 8/1999 | Kopp et al. | |
| 6,099,712 A * | 8/2000 | Ritzdorf et al. | 205/123 |
| 6,238,529 B1 | 5/2001 | Geissler et al. | |
| 6,319,383 B1 * | 11/2001 | Kopp et al. | 205/96 |
| 6,322,678 B1 * | 11/2001 | Woodruff et al. | 204/297.08 |
| 7,048,840 B1 * | 5/2006 | Werfel et al. | 205/51 |
| 7,118,658 B2 * | 10/2006 | Woodruff et al. | 204/242 |

FOREIGN PATENT DOCUMENTS

| | | |
|---|---|---|
| CA | 2 341 218 A1 | 3/2000 |
| DE | 37 03 549 | 9/1987 |
| DE | 39 39 256 A1 | 5/1991 |
| DE | 42 11 253 A1 | 10/1993 |
| DE | 37 03 549 C2 | 5/1994 |
| DE | 297 08 602 U1 | 8/1997 |
| DE | 197 36 352 C1 | 12/1998 |
| DE | 297 08 602 U1 | 3/2000 |
| DE | 100 43 815 C2 | 8/2002 |
| DE | 100 65 643 C2 | 8/2002 |
| DE | 100 43 815 C2 | 3/2003 |
| DE | 100 65 643 C2 | 3/2003 |
| DE | 42 11 253 A1 | 8/2010 |
| EP | 1 230 446 B1 | 5/2005 |
| JP | U3085849 | 5/2002 |
| JP | 2003-328193 | 11/2003 |
| WO | 9849374 | 11/1998 |
| WO | WO 98/49374 | 11/1998 |
| WO | 99 29931 A2 | 6/1999 |
| WO | WO 99/29931 | 6/1999 |
| WO | 03071009 A1 | 8/2003 |
| WO | WO 03/071009 A1 | 8/2003 |

* cited by examiner

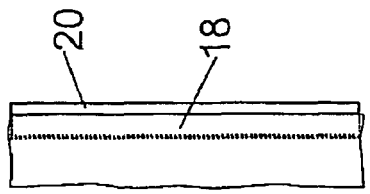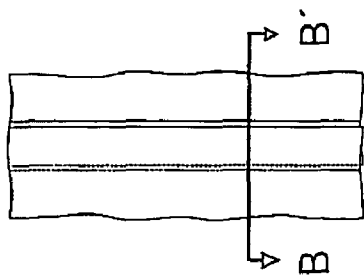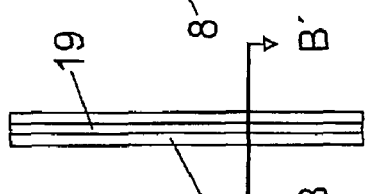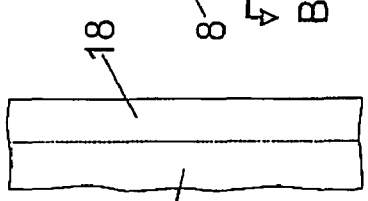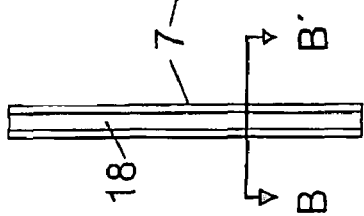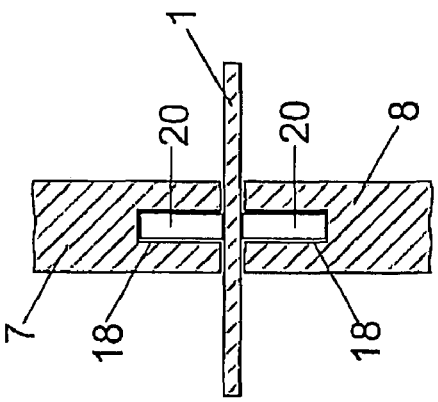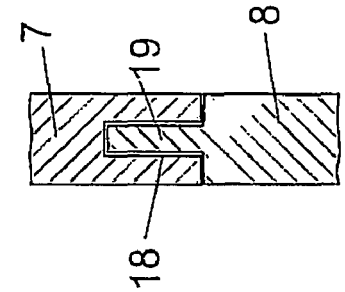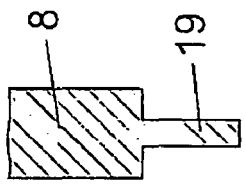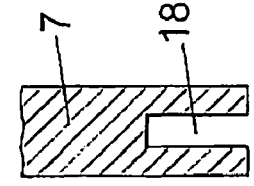

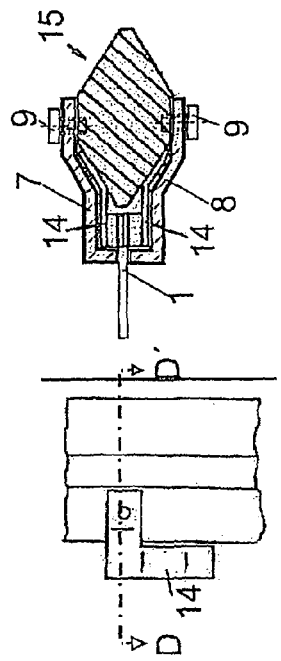
Fig. 7c
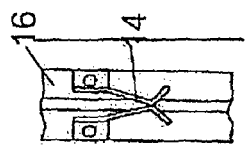
Fig. 7a
Fig. 7b
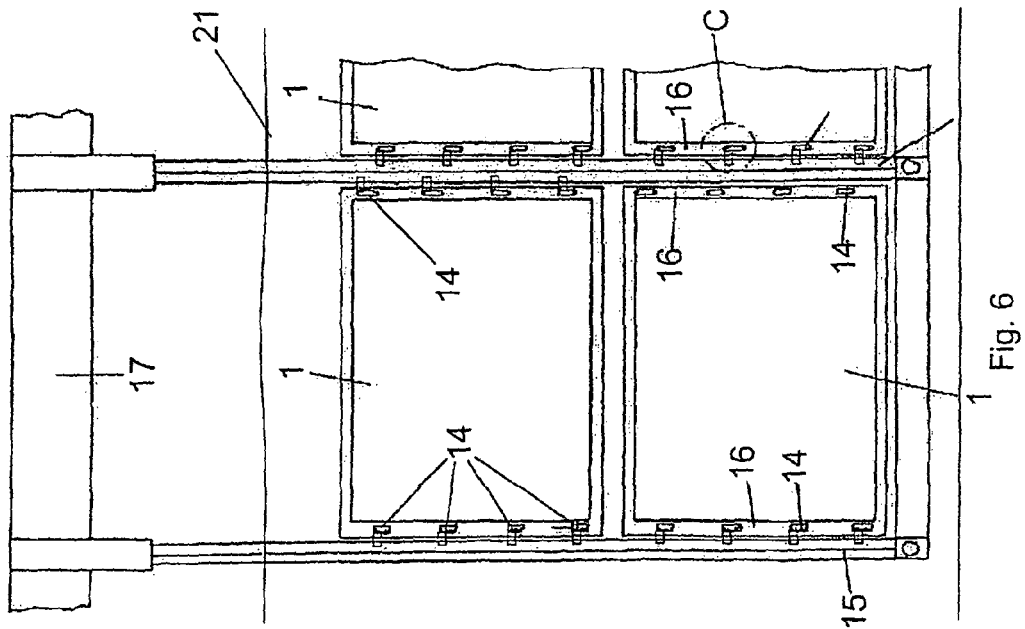
Fig. 6

POWER SUPPLY DEVICE IN A DEVICE FOR ELECTROCHEMICAL TREATMENT

This application is a National Stage application of International Application No. PCT/EP2004/009272, filed Aug. 18, 2004, which claims priority to German Application No. DE 103 40 888.6, filed Sep. 4, 2003.

BACKGROUND OF THE INVENTION

1. Field of the Invention

The present invention relates to an electrical supply unit for material to be treated in a device for the electrochemical treatment thereof, especially in galvanising or etching systems.

1. Description of the Related Art

For the electrolytic application of a conductive layer (galvanising), a material to be treated is connected via electrical feeds and fastening means to a negative pole of a direct-current source. An opposite electrode, in this case the anode, is accordingly connected electrically conductively to a positive pole of the direct-current source. Both the anode and the material to be treated lie in an electrolyte which contains positively charged ions of the material to be applied. Because of the electric field which is formed between the anode and the material to be treated, they migrate to this material to be treated and are deposited there.

The polarities are correspondingly reversed in electrolytic etching, the material to be treated then being connected to the positive pole of the current source.

At least on the end next to the material to be treated, the electrical feeds are usually designed as contact means in the form of terminal clips, tongs or clamps, so that they can hold the material to be treated. At least the interior of the entire electrical feed, including this contact means, must then consist of an electrically conductive material and be dimensioned so that the heavy currents encountered in practice can be transmitted to the material to be treated with only minor power loss and heating. The exact dimensioning of the electrical feeds depends on the electrically conductive material which is used, a larger conduction cross section being required in the case of a more poorly conducting material, for example.

The electrical feeds should then be electrically insulated on the surface as much as possible, in order to prevent large amounts of metal from also being deposited on the electrical feed during the galvanising process, that is to say when metal is being deposited on the material to be treated. In such a case, the metal needs to be removed from the electrical feed in a subsequent demetallising process, in order to avoid possible interference with the transmission of current from the contact means of the electrical feed to the material to be treated, due to these build-ups of metal. Indeed, approximately two to ten times the amount of metal is deposited on blank parts of the electrical feed compared with the surface of the material to be treated. This is because in an imaginary resistor circuit from the direct-current source to the material to be treated, the electrical feed is arranged closer to this direct-current source and therefore at a correspondingly higher electrical potential, so that field-line concentration takes place there and in turn causes greater deposition of metal.

Such a blank electrical feed also acts as a so-called robber cathode in relation to the material to be treated. Specifically, in the immediate vicinity of the electrical feed, the undesired metal deposit on the electrical feed leads to a reduction in the thickness of the metal layer on the material to be treated. For example when printed circuit boards are being coated, for which very uniform layers are important, this leads to unusable reject boards in a subsequent etching step.

In order to avoid this problem, it is known to electrically insulate all the surfaces of the electrical feed that may come in contact with the electrolyte, apart from those sections of the contact means which are used for making electrical contact with the material to be treated, for example contact areas. This is because no metal can deposit on electrically insulated surfaces during a galvanising method.

This insulation is generally provided by special plastics which have a high chemical stability, a high thermal stability and a high abrasion resistance. This special plastic insulator layer is applied by immersion or spraying with subsequent curing of the layer. If the contact means, for example a contact area, has also been insulated during such an immersion or spraying process, then it needs to be mechanically uncovered after the after curing, for example by grinding or milling. If a thicker layer is to be applied owing to more demanding requirements for the strength of the insulation, it is necessary to repeat the immersion or spraying process with subsequent curing in each case.

In order for this applied insulator layer to adhere well to the electrical feed, the electrical feed must be thoroughly cleaned before the coating and often subjected to an extra treatment, for example by grinding or sandblasting, in order to approve the adhesion.

Despite the elaborate processing and the use of high-quality special plastics such as Halar™, such insulator layers are repeatedly damaged by a sharpedged material to be treated, especially when automatic coating units are used for galvanising devices. The insulation is broken through at these points of damage, and metal will be deposited. Often after only a short time, this metal can no longer be removed by inexpensive electrolytic demetallising because, with this method, the conducting connection to the usually relatively small-area points of damage is frequently broken before all the deposited metal can be dissolved. In this case, the relevant electrical feeds need to be dismantled and demetallised chemically. If this has to be done at intervals which are too short, the electrical feed will be replaced by a new one. If an expensive metal has been used for the electrical feed, then elaborate treatment is needed in which the nonconducting plastic insulator layer is removed by melting, burning off or mechanical processing, the metal surface is re-treated and the electrical feed is re-coated with a plastic insulator layer. All these working steps are elaborate and very expensive.

An example of such an electrical feed is represented in FIG. 8. In this case, an upper electrical feed 2 and a lower electrical feed 3 respectively end in contact elements 12. For example, the lower electrical feed 3 is fastened to a chain circulating in an electrolyte bath, or a toothed belt, and is moved into or out of the plane of the drawing because of a corresponding drive. The upper electrical feed 2 is mounted so that it can move in a vertical direction, as indicated by the arrow, and is pressed downwards by a compression spring. The electrical feeds 2 and 3 thus form a clamp, the upper electrical feed 2 constituting a clamp upper part and the lower electrical feed 3 constituting a clamp lower part. A material 1 to be treated can therefore be clamped between the two contacts 12.

Using a thrust block (not shown) on the upper electrical feed 2, and by means of a sloping plane on an upper feed of the electrical feed, the clamp formed in this way can be closed when entering a galvanising region and re-opened when leaving this region. When it is closed, the clamp therefore engages with the material 1 to be treated and makes the electrical connection to the corresponding pole of the electrical supply. When leaving the galvanising region, the electrical feed is re-opened and the material 1 to be treated is transported further by means of a roller path.

In order to prevent the metallic upper and lower electrical feeds 2, 3 from being galvanised and acting as robber cathodes, they are provided with the aforementioned thin plastic insulator layer as described above, at least to above the liquid level 21 of the galvanising bath. This insulation layer extends as far as the side face of the contacts 12.

An alternative solution approach is known from DE 197 35 352 C1. In this case, electrical feeds made of a blank conductive material are used without a plastic insulator layer. In order to avoid excessive deposition of metal on the electrical feed, masks are provided which are arranged extensively along an entire galvanising cell in which the electrical feed is used. The masks are in this case fastened rigidly to a housing of the galvanising cell, or to the anodes. The masks are made of an electrically insulating material, at least on their surface, and they are arranged so that only minor migration of the ions contained in the electrolyte, especially the metal ions, can take place to the electrical feeds when galvanising, since these ions cannot penetrate the electrically insulating masks and no current can flow through the latter. The ions take the path of least resistance instead, in this case the intended path to the material to be treated. In this context, screening of the field lines in the electrolyte by the masks is also referred to.

A gap in the masks must in this case be arranged so that a maximum thickness of the material to be treated, for which the device is designed, passes through these gaps but without touching the masks.

If thin material to be treated, that is to say with a thickness less than the maximum thickness, is being treated in the system, then this leads to a larger clearance between the material to be treated and the masks. So great an amount of ions can then migrate to the contact elements that, in spite of the masks, relatively thick metal layers with a thickness of about 0.1 mm or more per pass can be deposited on the electrical feeds in the vicinity of the gaps. These metal layers can then no longer be removed by subsequent electrolytic demetallising, as mentioned above, in the time available before the next pass.

Easy removal of such an undesired metal layer on or in the contact elements during operation is readily possible in horizontal galvanising systems for the copper-plating of printed circuit boards with a thickness of up to about 0.04 mm. Beyond a layer thickness of about 0.05 mm to 0.1 mm for the undesired metal layer, depending on the system configuration, the layer can no longer be removed reliably from all points of the contact elements. The layers accumulate during the subsequent passes and must be elaborately removed in operational pauses. With a layer thickness beyond 0.1 mm per pass for this layer, interference with production is to be expected.

Another disadvantage with this embodiment is that, in the case of electrical feeds arranged as in FIG. 8, the masks cannot be moved together with the engaging movements of the electrical feeds.

WO99/29931 discloses a clamp-like holding device for releasably holding objects, such as printed circuit boards, to be galvanised by means of dip galvanising. The holding device comprises a first bar, a second bar and mutually opposing contact pins for making contact with and clamping the printed circuit board at lower end regions of the first and second bars. A sleeve which is elastically deformable in the axial direction of the contact pins, for example in the form of a bellows, is fastened to each of the contact pins and, in the relaxed state, extends beyond the contact area of the contact pin. When the clamp is holding a printed circuit board, the free ends of the sleeves lie tightly on the surface of the printed circuit board and therefore prevent the contact areas from coming in contact with the galvanitic bath, so as to prevent metallic deposits on the contact areas.

DE 42 11 253 A1 discloses a galvanising unit in which the work-pieces to be galvanised are transported in a horizontal pass through an electrolyte. The cathodic contact with the work-pieces travelling through is in this case made by rotatable contacting wheels, with covers of insulating material being applied to end sides of the contacting wheels in order to prevent undesired metal deposits on the end sides.

DE 100 43 815 C2 also discloses a galvanising unit. In this case, contact is made with the material to be treated by strip-shaped contact elements. For example, a partially vulcanised electrically insulating material is used in order to prevent undesired metallisation of the contact strips with the contact elements.

DE 100 65 643 C2 also uses contact strips for making contact with material to be treated, the contact strips comprising contact insulations which fully cover the contact strips apart from an actual contact area.

WO 03/071009 A1 discloses another galvanising unit, in which an electrical contact strip is built into an electrically insulating shaft, with the insulating shaft protecting the contact strips against undesired metallisation.

SUMMARY OF THE INVENTION

It is therefore an object of the present invention to provide an electrical supply unit for material to be treated in a device for the electrochemical treatment thereof, in which the electrical feeds are protected as effectively as possible against the deposition of metal, and which is also easy to produce and simple and inexpensive to maintain.

This object is achieved by an electrical supply unit according to claim 1. The dependent claims define preferred or advantageous exemplary embodiments of the invention.

In accordance with the invention, an electrical supply unit is provided having at least one electrical feed made of an at least partially blank electrically conductive material, contact means for making electrical contact with the material to be treated being provided at one end of the at least one electrical feed, wherein the electrical supply unit comprises at least one electrically insulating removable shell which encloses the at least one electrical feed, over a particular length starting from the contact means, so that no metal deposit of more than 0.04 mm is formed on the blank electrically conductive material when the electrical feed is immersed in a liquid during the electrochemical treatment.

This makes use of the fact that metal ions move very slowly in an electrolyte. Metal ions therefore need to be constantly brought to the material to be treated by a strong electrolyte flow in high-performance galvanic baths. Otherwise, the metal ions will become depleted in the electrolyte and no deposition of metal will take place, or only minor deposition will take place. Instead, the electric current will form hydrogen at the cathode.

This means that an absolutely hermetic enclosure is not strictly necessary in order to prevent metal coating of the electrical feeds during a galvanising process. It is merely necessary to prevent the metal ions from migrating back to the blank material.

In other words, the electrical supply unit in accordance with the invention uses a substantially form-fitted shell around the electrical feed, which prevents the metal ions from migrating back to the blank electrically conductive material.

These shells may be prepared separately from the electrical feeds and fastened to them by fastening means, for example screws or clips. On the one hand this leads to straightforward production, and on the other hand damaged shells can be replaced easily. The at least one shell is in this case preferably made by injection moulding, deep drawing in prefabricated moulds, automatic mould cutting or selective laser sintering of a plastic with a wall thickness of from 0.2 mm to 8 mm.

The at least one shell may in this case be formed by a plurality of parts, which are connected to one another by means of a seal or by means of interlocking sections. This provides a sufficient obstacle to the migration of ions back through the electrolyte, and therefore prevents the undesired and problematic deposition of metal with a thickness of more than 0.04 mm. Such a shell may, in particular, be used for mechanically stressed sections of the at least one electrical feed, while mechanically unstressed parts may also be provided with an insulating coating. The electrical supply unit may, in particular, comprise two preferably rigid and/or L-shaped electrical feeds which can be moved relative to each other and can therefore be used as a clamp for holding a material to be treated. A spring mechanism may be provided for this purpose.

The electrical feeds themselves are in this case preferably made of titanium or stainless steel, since these metals are stable with respect to the chemicals conventionally used in galvanising methods. In appropriate electrolytes, however, an even more conductive material such as copper may be used as the material for the electrical feed. The distance of the shell from the electrical feeds is preferably in the range of from 0.1 to 4 mm, so that as little electrolyte as possible can accumulate between the electrical feed and the shell.

Trials with an electrical supply unit in accordance with the invention have shown that, without using additional plastic seals in the vicinity of the material to be treated, the deposition of metal on the blank electrically conductive material was then only about 0.005 mm per pass on average, that is to say far lower than the 0.04 mm limit. No reduction of the metal layer on the material to be treated could be found due to the robber cathode effect described in the introduction.

BRIEF DESCRIPTION OF THE DRAWINGS

The invention will be explained in more detail below with the aid of preferred exemplary embodiments and with reference to the appended drawing, in which:

FIGS. 3a-3c show a preferred embodiment of a shell part from FIGS. 1 and 2 in detail A of FIG. 1, from the front, from the side and as a section from above, FIGS. 4a-c show a preferred embodiment of another shell part from FIG. 1 in the same views as FIGS. 3a-c, FIGS. 5a-d show the shell parts from FIGS. 4a-c and FIGS. 5a-c in combination with one another, FIG. 6 shows a detail of a product support of a vertically operating galvanising system, in which electrical supply units in accordance with the invention can be used, FIG. 7 shows an enlarged representation of electrical supply units in accordance with the invention on elongate electrical feeds as in FIG. 6.

DETAILED DESCRIPTION OF THE INVENTION

Figure 1:
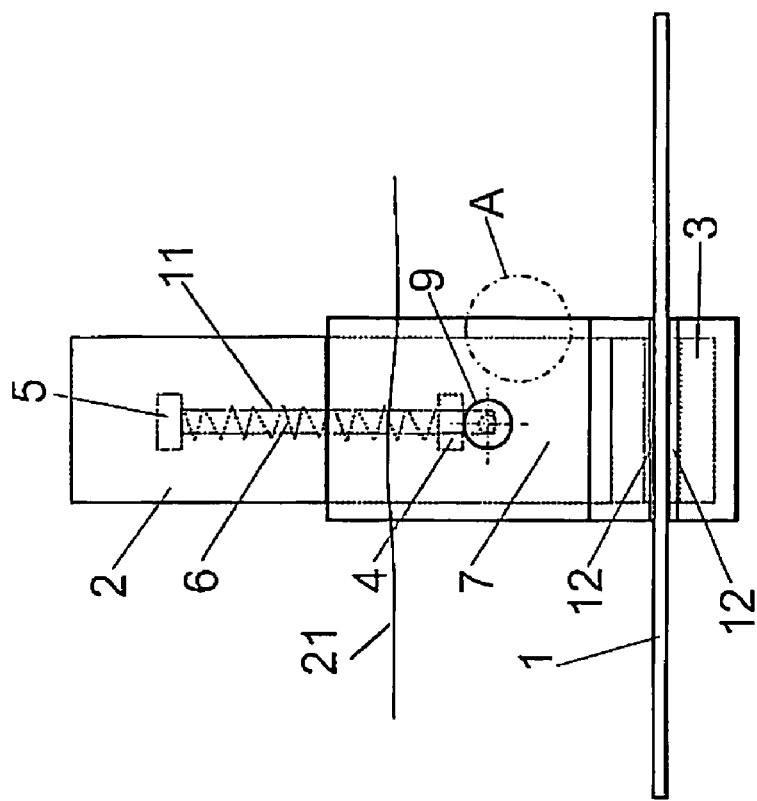
FIG. 1 shows an electrical supply unit in accordance with the invention with two shell parts.
Figure 8:
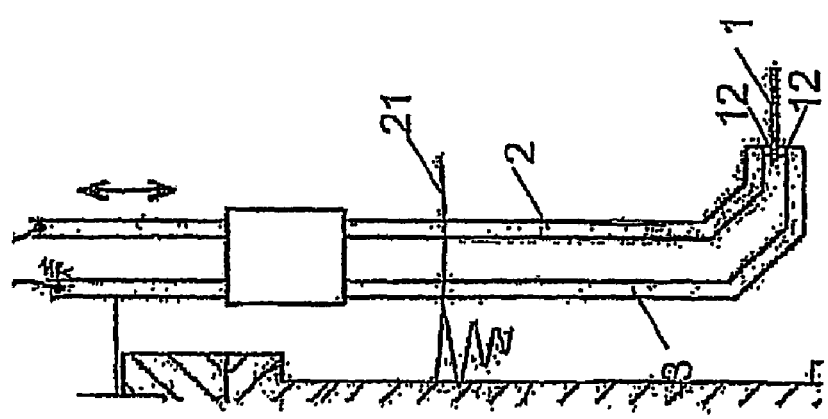
FIG. 8 shows an electrical supply unit in accordance with the prior art.

FIG. 1 represents an exemplary embodiment of an electrical supply unit in accordance with the invention, in the same view as in FIG. 8 which was described in the introduction. The same references are used for elements which correspond to each another. A material 1 to be treated is held, and electrical contact is made with it, by a clamp which is formed by an upper electrical feed or a clamp upper part 2 and a lower electrical feed or a clamp lower part 3, with the clamp upper part 2 and the clamp lower part 3 respectively consisting of a blank material with good conductivity. A guide block 4, in which a spring guide 11 is mounted so that it can move in the vertical direction in a bore, is rigidly fastened to the clamp upper part 2. The clamp lower part 3 has a rigidly fastened spring block 5, in which the spring guide 11 is firmly engaged. Between the two blocks 4 and 5, a spring is arranged on the spring guide 11 and presses the clamp upper part 2 against the clamp lower part 3. At a front end of the clamp upper part 2 and of the clamp lower part 3, contact means or contact elements 12 are respectively connected electrically conductively to the clamp upper and lower parts in a conducting fashion. The material 1 to be treated is engaged between these contact elements 12, and an electric current can be transferred to the material 1 to be treated from the clamp upper part 2 and the clamp lower part 3. The engagement of the material 1 to be treated may also be used in order to transport it.

Starting from the contact element 12, a shell part 8 which encloses the clamp lower part 3 at a small distance from it, is fastened to the latter. The shell part 8 is in this case designed so that it extends at least to above the liquid level 21 of an electrolyte in an electrochemical treatment device. The shell part 8 may, for example, be fastened to the clamp lower part 3 by means of a plastic screw or using clips 10, which are formed on the shell part 8 and latch behind an inner edge of the clamp lower part 3. The shell part 8 prevents metal ions migrating back from the electrolyte surrounding the clamp lower part 3 to an outer side of the clamp lower part 3 and, as explained in the introduction to the description, this simultaneously leads to screening of electric field lines formed between an anode (not shown) and the material to be treated, or the electrical feeds. In the present example, the shell part 8 is open on the side facing the clamp upper part. In principle, however, a closed design which fully surrounds the clamp lower part 3 is also conceivable.

In a similar way, a shell part 7 is fastened to the clamp upper part 2 and bears tightly on the clamp upper part 2 at least on the outer side, that is to say on the side facing the clamp lower part 3, in order to minimise any possible accumulation of the electrolyte between the shell part 7 and the clamp upper part 2. In this example, the shell part 7 is fastened to the clamp upper part by means of the plastic screw 9. Fastening by a single plastic screw 9 is sufficient if the shell bears tightly enough.

The shell part 7—like the shell part 8—is open in the region which faces the clamp lower part 3.

When the clamp formed by the clamp upper part 2 and the clamp lower part 3 opens and closes, glide surfaces 22 formed at the contact points of the shell parts 7 and 8 glide firmly against each other so that good electrical insulation, a liquid seal which prevents the metal ions from migrating back, as well as good screening of the electrical field lines are ensured in this case as well. The horizontal sections where the lower parts 7 and 8 meet are formed as closure surfaces 23. In so far as it is necessary, these closure surfaces 23 are recessed in the front part, in the region where the material 1 to be treated is held and contact is made with it, in order to allow good fastening of and contact with the material 1 to be treated. When the clamp is in the closed state, the recessed surfaces of the shell parts 7, 8 are close to material 1 to be treated, but without touching it, so that relatively good sealing is obtained in this case as well. If need be, the remaining small clearance may also be closed off by a soft plastic seal, as described below. The same applies for the other surfaces of the shell parts 7 and 8 which face the material to be treated, in order to close off intermediate spaces found there.

The shell parts 7 and 8 thus form a shell which encloses the electrical feeds 2 and 3, starting from the contact elements 12, so as to substantially prevent metal ions migrating back from the electrolyte found outside the shell.

Figure 2:
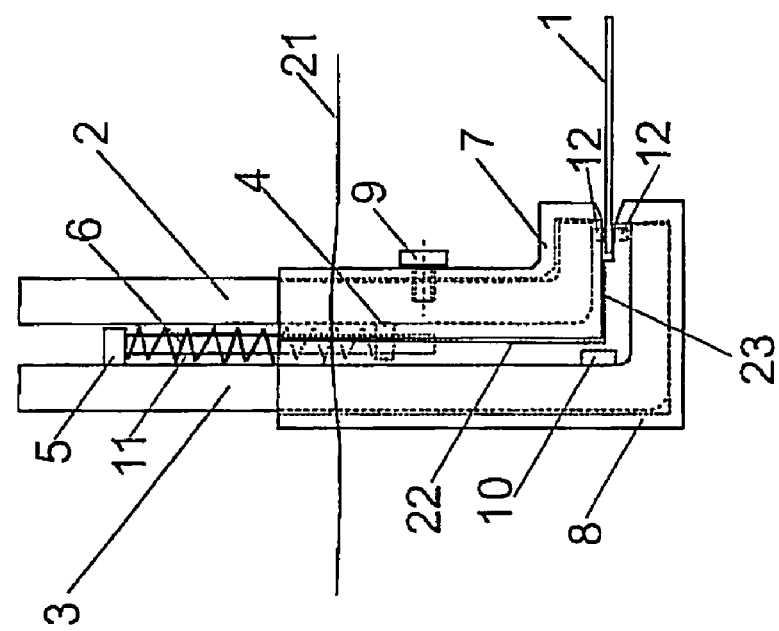
FIG. 2 shows the electrical supply unit of FIG. 1 in a view rotated through 90°.

FIG. 1 shows the electrical supply unit of FIG. 1 in a view rotated horizontally to the left through 90°, the clamp formed by the clamp upper part 2 and the clamp lower part 3 also being in a closed state and holding the material 1 to be treated, for example a printed circuit board. Then material 1 to be treated is engaged by means of the contact elements 12 between the clamp upper part 2 and the clamp lower part 3 by means of the compression spring 6 with a good electrical connection. It can be seen clearly in FIG. 2 that there is a recess at the front end, as mentioned above, in at least one of the shell parts 7, 8 so that the material 1 to be treated can be held firmly. Since the shell parts 7, 8 are fastened to the clamp parts 2, 3, they move together with the clamp parts when opening and closing. The small distance of the recess surfaces from the material to be treated, which is about 0.05-0.3 mm, is therefore always the same irrespective of the thickness of the material 1 to be treated.

As mentioned above, the glide surfaces 22 and the closure surfaces 23 are as close together as possible in order to ensure good sealing. Ways in which the sealing can be improved even further will be explained below.

In this context, FIG. 3 shows a possible configuration of the shell part 7, FIG. 4 shows a possible configuration of the shell part 8 and FIG. 5 shows the interaction of the shell parts 7 and 8 configured in this way. FIGS. 3a, 4a and 5a show the detail A from FIG. 2 in the viewing direction represented there, that is to say into the plane of the drawing of FIG. 2. FIGS. 3b, 4b and 5b show a corresponding side view and FIGS. 3c, 4c and 5c show a sectional view along the respective line B-B' of the respectively associated FIG. a, that is to say a plan view. As represented in the figures, for example, the shell part 7 has a mortise 18 and the shell part 8 has a tenon 19. These configurations could of course also be reversed. As shown in FIG. 5c, the tenon 19 of the shell part 8 engages in the mortise 18 of the shell part 7. This inter-engagement is consistently obtained in the vicinity of the glide surfaces 22. If this configuration is used for the closure surfaces 23, the tenon 19 and the mortise 18 are inserted into one another when the clamp is being closed and move out again when it is being opened. Even better sealing between the shell parts 7 and 8 is achieved by such a configuration. Virtually no electrolyte can therefore reach the clamp upper part 2 or the clamp lower part 3.

Such a configuration is not possible in the immediate vicinity of the contact elements 12, since the material 1 to be treated is engaged there. Here, for example, sealing may be carried out as shown in FIG. 5d. In this case, both the shell part 7 and the shell part 8 have a mortise 18 in which a plastic sealing strip 20 is engaged, fitted or adhesively bonded. When the clamp is closed, the plastic sealing strips 20 press against the material 1 to be treated and therefore close off the contact surfaces in this region, but without substantially compromising the secure electrical contact with the material 1 to be treated. Soft plastics, soft rubber or foam materials are suitable for such sealing. Care should be taken to ensure stability with respect to chemicals present in the electrolyte.

Flat or round seals which ensure optimum sealing or screening may, as an alternative, be provided in the contact region of the shell parts 7 and 8.

Often, the process of closing the clamp is not carried out until the clamp has already been immersed in the electrolyte. The interior of the shell is therefore filled with electrolyte. Owing to the relatively good screening of the field lines and the sealing, and the consequently reduced migration of metal ions, this only leads to minor deposition of metal which can be electrochemically removed with ease.

In principle, the shells formed by the shell parts 7 and 8 may be provided only in a region where damage to the shell parts is to be expected, for example when loading and unloading the material 1 to be treated. A conventional plastic coat may be provided in other regions where no damage can take place.

Another exemplary embodiment of the invention will now be explained.

FIG. 6 shows details of a product support with a product support rail 17 and elongate frame rods 15, as are used for galvanising flat material 1 to be treated in so-called vertical dipping-bath galvanising systems. The frame rods 15 are made of a conducting material and they are provided with an insulating layer on all sides, at least extending to above the liquid level 21 of the electrolyte bath.

Each frame rod 15 is fitted with terminal springs 14 which are connected with good conduction to the metallic frame rod 15. FIG. 7a shows a detail enlargement of the broken circle C in FIG. 6. As can be seen, a terminal spring 14 consists of a rectangularly shaped metal plate which is screwed, welded or riveted to the frame rod 15. Two of these spring elements 14 are fastened exactly opposite each other on the frame rod 15 in each case, and they can therefore engage the material 1 to be treated at its edge 16. In this example, the product support rail 17, the frame rod 15 and the terminal springs 14 form an electrical feed to the material to be treated. Conventionally, these terminal springs are also provided with a plastic coat and only remain blank for the transmission of current in a small region of the terminal position. This again leads to the disadvantages explained in the introduction to the description.

FIG. 7c shows a section of the frame rod along a line D-D' of FIG. 7a. Again, according to the present invention, shell parts 7 and 8 are provided at least in the vicinity of the terminal springs 14. The shell parts 7 and 8 may be sealed from one another and from the material 1 to be treated as described in FIGS. 3-5.

In this exemplary embodiment, the contact points of the terminal springs thus correspond to the contact elements 12 of the exemplary embodiment in FIGS. 1-5, and the rest of the terminal spring 14 corresponds to the electrical feeds 2 and 3.

Since the frame rods 15 usually have a length in excess of 600 mm, it may be advantageous here to make the shell parts 7, 8 in a plurality of pieces and to configure the joins in the manner described above. The fastening may again be carried out by using screws 9 made of a nonconducting material.

Of course, the application of the invention is not limited to the exemplary embodiments presented here. In particular, various shapes and types of electrical feeds may be protected against deposition in the manner according to the invention.

The invention was described above with reference to the example of galvanising devices. It is, however, also possible to use an electrical supply unit in accordance with the invention for other types of electrochemical treatment, such as the etching described in the introduction.

LIST OF REFERENCES 1 material to be treated
2 upper electrical feed or clamp upper part
3 lower electrical feed or clamp upper part
4 guide block upper part
5 spring block lower part
6 compression spring
7 shell part
8 shell part
9 fastening screw
10 clip
11 spring guide
12 contact element
14 terminal spring
15 frame rod
16 edge
17 product support rail
18 mortise
19 tenon
20 seal
21 liquid level
22 glide surfaces
23 closure surfaces

The invention claimed is:

1. An electrical supply unit for material to be treated in a device for the electrochemical treatment thereof, the electrical supply unit comprising:
   at least one electrical feed made of an at least partially blank electrically conductive material, wherein the at least one electrical feed comprises a first electrical feed with a first contact means for making contact with the material to be treated at one end of the at least one electrical feed, and wherein the at least one electrical feed comprises a second electrical feed with a second contact means for making contact with the material to be treated at the one end of the at least one electrical feed; and
   at least one electrically insulating removable shell which encloses the at least one electrical feed, including the first electrical feed and the second electrical feed, over a particular length starting from the first contact means and the second contact means,
   wherein the at least one shell is fastened to the at least one electrical feed in a manner to allow easy replacement and fastening of the at least one shell,
   wherein the first electrical feed and the second electrical feed are movable relative to each other, and
   wherein the material to be treated can be held between the first contact means and the second contact means.

2. The electrical supply unit according to claim 1, wherein the at least one shell encloses the at least one electrical feed so that no substantial migration of ions takes place from outside the shell to the blank parts of the electrically conductive material when the electrical feed is immersed in an electrolytic liquid and a voltage is applied to the electrical feed.

3. The electrical supply unit according to claim 1, further comprising:
   fastening means for fastening the at least one shell to the at least one electrical feed.

4. The electrical supply unit according to claim 1, wherein the at least one shell is substantially form-fitted onto the at least one electrical feed.

5. The electrical supply unit according to claim 1, wherein the at least one shell has a wall thickness of from 0.2 mm to 5 mm.

6. The electrical supply unit according to claim 1, wherein a distance of the shell from the electrical feeds lies between 0.1 and 4 mm.

7. The electrical supply unit according to claim 1, wherein the at least one shell is made by injection molding, deep drawing in prefabricated molds, automatic mold cutting or selective laser sintering.

8. The electrical supply unit according to claim 1, wherein the at least one shell is made of a plastic material.

9. The electrical supply unit according to claim 1, wherein the at least one shell is formed by at least two parts.

10. The electrical supply unit according to claim 9, wherein a connection is made by means of a seal between the at least two parts.

11. The electrical supply unit according to claim 9, wherein a connection is made between the at least two parts by means of interlocking sections of the at least two parts.

12. The electrical supply unit according to claim 1, wherein the at least one shell does not have any substantial flexibility.

13. The electrical supply unit according to claim 1, wherein the at least one shell encloses mechanically stressed sections of the at least one electrical feed, while mechanically unstressed parts of the at least one electrical feed are provided with an insulating coating.

14. The electrical supply unit according to claim 1, wherein the at least one electrical feed is of L-shaped design.

15. The electrical supply unit according to claim 1, wherein a seal for hermetically closing an intermediate space between the at least one shell and the material to be treated, with which contact is made by the contact means, is arranged in the at least one shell in a section on which the contact means are connected to the at least one electrical feed.

16. The electrical supply unit according to claim 1, wherein the first electrical feed and the second electrical feed can be moved relative to each other by a spring mechanism.

17. The electrical supply unit according to claim 1, wherein the at least one electrical feed is made of titanium, stainless steel or copper.

18. The electrical supply unit according to claim 1, wherein the at least one electrical feed does not have any substantial flexibility.

19. A device for the electrochemical treatment of material to be treated,
   wherein the device comprises an electrical supply unit according to claim 1 for the material to be treated.

20. The device according to claim 19, wherein the device is designed for galvanising the material to be treated.

21. The device according to claim 19, wherein the device is designed for continuously treating the material to be treated.

22. The electrical supply unit according to claim 1, wherein said fastening means is configured to form a clamp.

23. The electrical supply unit according to claim 1, wherein said contact means is at most partially surrounded by said at least one shell.

24. The electrical supply unit according to claim 1, wherein said contact means is arranged to at least partially contact an electrolyte solution during said electrochemical treatment.

25. The electrical supply unit of claim 1, wherein said at least one shell is fastened to said at least one electrical feed by further fastening means, said further fastening means being configured to allow a reversible fastening and removal of the at least one shell to and from the at least one electrical feed.

26. The electrical supply unit of claim 25, wherein said further fastening means comprises one or more elements selected from the group consisting of an element formed on the at least one shell, a clip, and a screw.

27. An electrical supply unit for material to be treated in a device for the electrochemical treatment thereof, the electrical supply unit comprising:
- at least one electrical feed made of an at least partially blank electrically conductive material;
- contact means for making electrical contact with the material to be treated being provided at one end of the at least one electrical feed.,
- at least one electrically insulating removable shell which encloses the at least one electrical feed, over a particular length starting from the contact means, and
- fastening means comprising a screw or a clip, wherein the at least one shell is fastened to the at least one electrical feed via the fastening means,
- wherein the at least one shell encloses the at least one electrical feed in a non-liquid tight manner.

28. An electrical supply unit for material to be treated in a device for the electrochemical treatment thereof, the electrical supply unit comprising:
- at least one electrical feed made of an at least partially blank electrically conductive material, wherein the at least one electrical feed comprises a first electrical feed with a first contact means for making contact with the material to be treated at one end of the at least one electrical feed, and wherein the at least one electrical feed comprises a second electrical feed with a second contact means for making contact with the material to be treated at the one end of the at least one electrical feed; and
- at least one electrically insulating removable shell which encloses the at least one electrical feed, including the first electrical feed and the second electrical feed, over a particular length starting from the first contact means and the second contact means,
- wherein the at least one shell is fastened to the at least one electrical feed,
- wherein the first electrical feed and the second electrical feed are movable relative to each other, and
- wherein the material to be treated can be held between the first contact means and the second contact means.

* * * * *